US012324775B2

(12) United States Patent
Kosh et al.

(10) Patent No.: US 12,324,775 B2
(45) Date of Patent: Jun. 10, 2025

(54) LOCKING PIVOT

(71) Applicant: Bodypoint, Inc., Seattle, WA (US)

(72) Inventors: Matthew Kosh, Seattle, WA (US); Kevin Durant, Seattle, WA (US); John Tilden, Seattle, WA (US)

(73) Assignee: Bodypoint, Inc., Seattle, WA (US)

( * ) Notice: Subject to any disclaimer, the term of this patent is extended or adjusted under 35 U.S.C. 154(b) by 0 days.

(21) Appl. No.: 18/993,462

(22) PCT Filed: Sep. 12, 2023

(86) PCT No.: PCT/US2023/073992
§ 371 (c)(1),
(2) Date: Jan. 10, 2025

(87) PCT Pub. No.: WO2024/059577
PCT Pub. Date: Mar. 21, 2024

(65) Prior Publication Data

US 2025/0161127 A1 May 22, 2025

Related U.S. Application Data

(60) Provisional application No. 63/375,496, filed on Sep. 13, 2022.

(51) Int. Cl.
*A61G 5/12* (2006.01)

(52) U.S. Cl.
CPC .................................... *A61G 5/125* (2016.11)

(58) Field of Classification Search
CPC ...................................................... A61G 5/125
See application file for complete search history.

(56) References Cited

U.S. PATENT DOCUMENTS

| | | | | |
|---|---|---|---|---|
| 307,545 A * | 11/1884 | Hart | E05C 1/04 292/210 |
| 6,007,082 A | 12/1999 | Watwood et al. | |
| 9,636,268 B1 * | 5/2017 | Bedillion | A61G 13/1235 |
| 9,776,830 B2 * | 10/2017 | Ooms | A61G 5/125 |
| 11,324,326 B2 * | 5/2022 | Hsieh | A47C 1/0305 |
| 11,890,238 B2 * | 2/2024 | Diodato | A61G 13/1285 |

(Continued)

FOREIGN PATENT DOCUMENTS

| | | | |
|---|---|---|---|
| DE | 3215000 A1 | 10/1983 | |
| WO | WO-2017216756 A1 * | 12/2017 | B62B 7/12 |

OTHER PUBLICATIONS

PCT/US2023/073992, "International Search Report and Written Opinion", Dec. 5, 2023, 10 pages.

*Primary Examiner* — Steve Clemmons
(74) *Attorney, Agent, or Firm* — Kilpatrick Townsend & Stockton LLP

(57) ABSTRACT

A locking pivot device can include a base, a stop ring, and a shuttle. The stop ring can be supported within the base. The stop ring can include stops formed by an inset in an inner perimeter of the stop ring. The stop ring can also include teeth formed in a different portion of the inner perimeter from the stops. The shuttle can be received in the base. The shuttle can include at least one tooth selectively engageable with the teeth of the stop ring to selectively lock the stop ring at different positions. The shuttle can further include lateral surfaces engagable with the stops to define a predetermined range of motion of the stop ring within the base.

15 Claims, 15 Drawing Sheets

(56) References Cited

U.S. PATENT DOCUMENTS

| | | | |
|---|---|---|---|
| 2009/0308174 | A1 | 12/2009 | Cutshall |
| 2015/0336478 | A1 | 11/2015 | Mitsuhashi et al. |
| 2019/0241232 | A1 | 8/2019 | McGowan et al. |

* cited by examiner

LOCKING PIVOT

CROSS-REFERENCES TO RELATED APPLICATIONS

This application is a National Stage Entry under 35 U.S.C. 371 of International Application No. PCT/US23/73992, filed Sep. 12, 2023, which claims the benefit of U.S. Provisional Patent Application No. 63/375,496, filed Sep. 13, 2022, the entire contents of which are hereby incorporated by reference for all purposes in their entirety.

BACKGROUND

Wheelchairs can include a variety of components that may be connected together. Different forms of attachment may be useful.

BRIEF DESCRIPTION OF THE DRAWINGS

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

DETAILED DESCRIPTION OF THE INVENTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Figure 1:
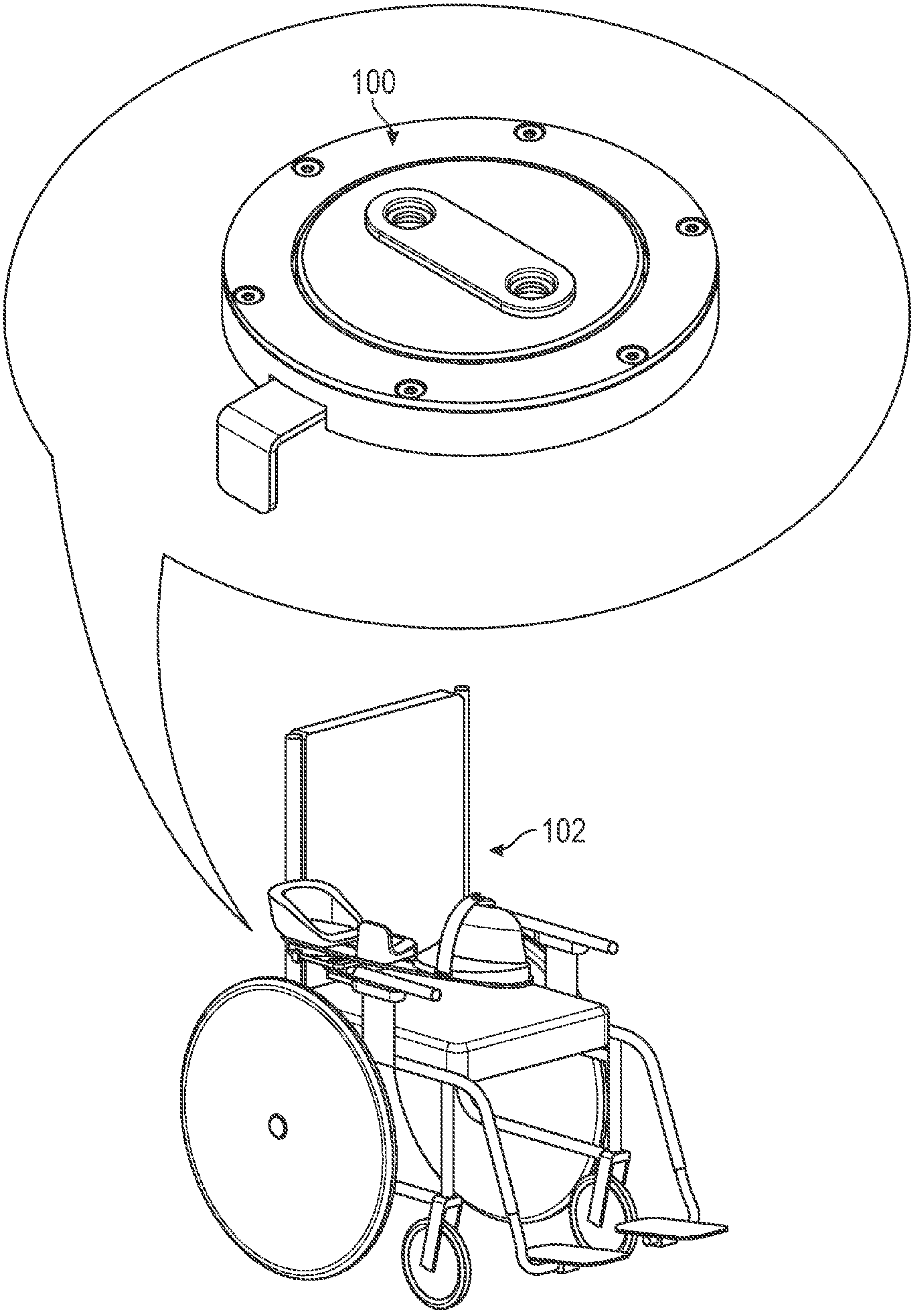
FIG. 1 shows a locking pivot device and an example of a context of use, in accordance with various embodiments.

FIG. 1 shows a locking pivot device 100 and an example of a context of use. In FIG. 1, the locking pivot 100 is shown relative to a wheelchair 102, for example.

Figure 2:
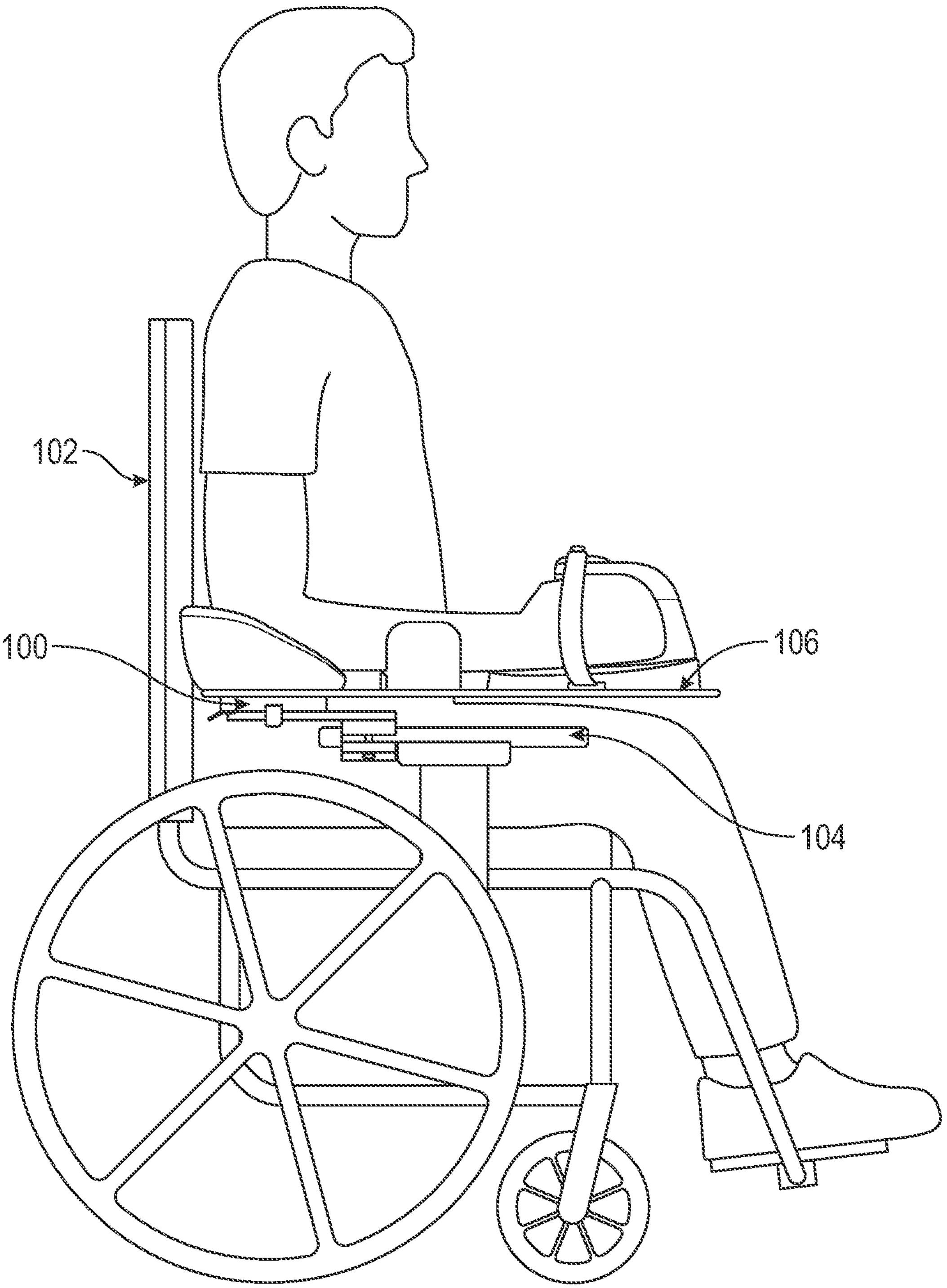
FIG. 2 is a side view of the wheelchair with a locking pivot installed, in accordance with various embodiments.

FIG. 2 is a side view of the wheelchair 102 with a locking pivot 100 installed. The wheelchair 102 is shown with an arm support 106 mounted in a position above an arm 104 of the wheelchair 102. The arm support 106 may include a platform, brace, and/or other structure suitably sized and/or shaped for receiving and supporting the forearm and/or other portion of a user of the wheelchair 102 in use. In particular, the locking pivot 100 is shown installed between the arm 104 of the wheelchair 102 and the arm support 106. For example, the locking pivot 100 may control relative motion between the arm 104 of the wheelchair 102 and the arm support 106. However, more generally the locking pivot 100 can function as a pivoting connector between any two structures.

Figure 3:
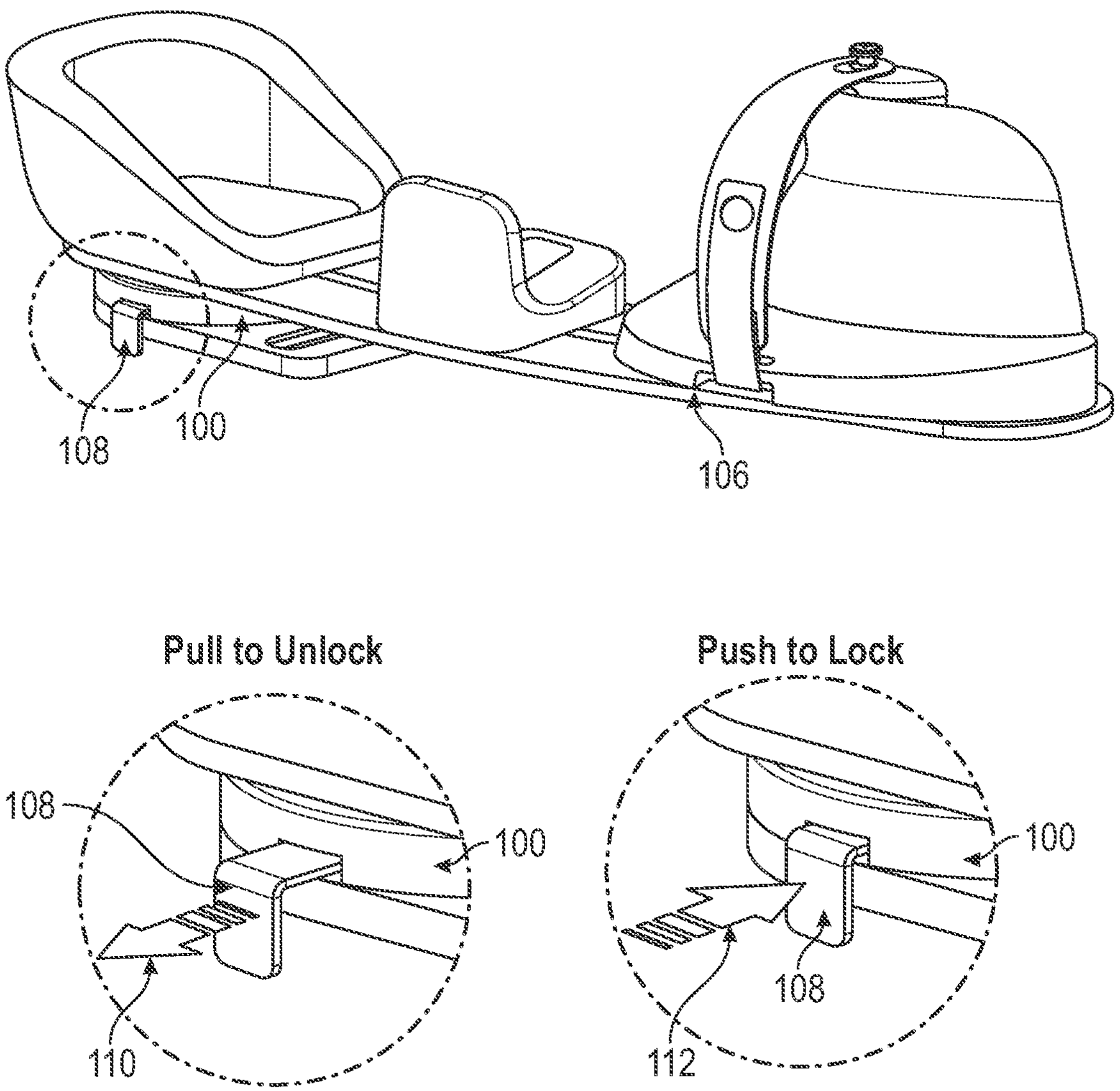
FIG. 3 shows views that illustrate an example of operation in use, in accordance with various embodiments.

FIG. 3 shows views that illustrate an example of operation in use. The locking pivot 100 can include a tab 108 that can be moved to change states of the locking pivot 100. The tab 108 is shown as a downwardly-extending flange, although any other graspable and user-movable structure or manipulandum may be utilized. In some examples, the tab 108 can be pulled to unlock (as at arrow 110) and pushed to lock (as that arrow 112). In an illustrative example, the tab 108 can include a hole or slot through which a cord can be passed, thereby allowing easier grasping for pulling in the direction shown by arrow 110. Additionally or alternatively, the cord may be extended, supplemented, or replaced by a cable e.g., of the type used for bicycle gear shifters or other structure that may enable remote locking or unlocking of the mechanism. However, in some embodiments, an orientation can be reversed so that pushing causes unlocking and pulling causes locking. In some embodiments, the locking pivot 100 can include suitable structure for reversing the orientation with a predetermined set of parts (e.g., changing orientation of parts without adding, swapping, or replacing parts). Some examples are discussed further with respect to FIG. 13, for example.

Figure 4:
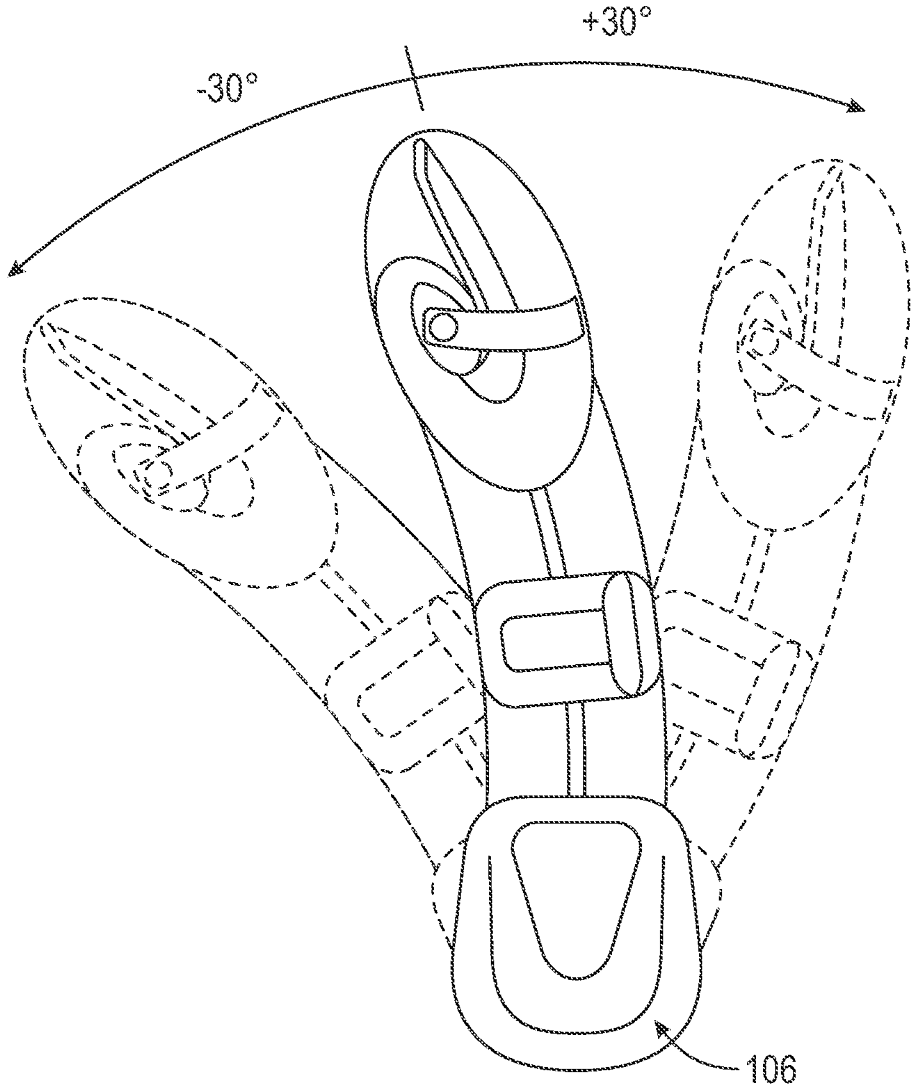
FIG. 4 is a top view showing different states of an arm support coupled with the locking pivot, in accordance with various embodiments.

FIG. 4 is a top view showing different states of an arm support 106 coupled with the locking pivot 100. The locking pivot 100 may allow the arm support 106 to move within 30° each direction of center or a home position (or in some other predetermined range of motion, which may include less than or more than 30°). In some arrangements, the locking pivot 100 may allow the arm support 106 to move 25° in one direction away from the home position and 35° in an opposite direction away from the home position (or some other combination in which amounts of motion differing from one another on either side of the home position are permitted).

Figure 5:
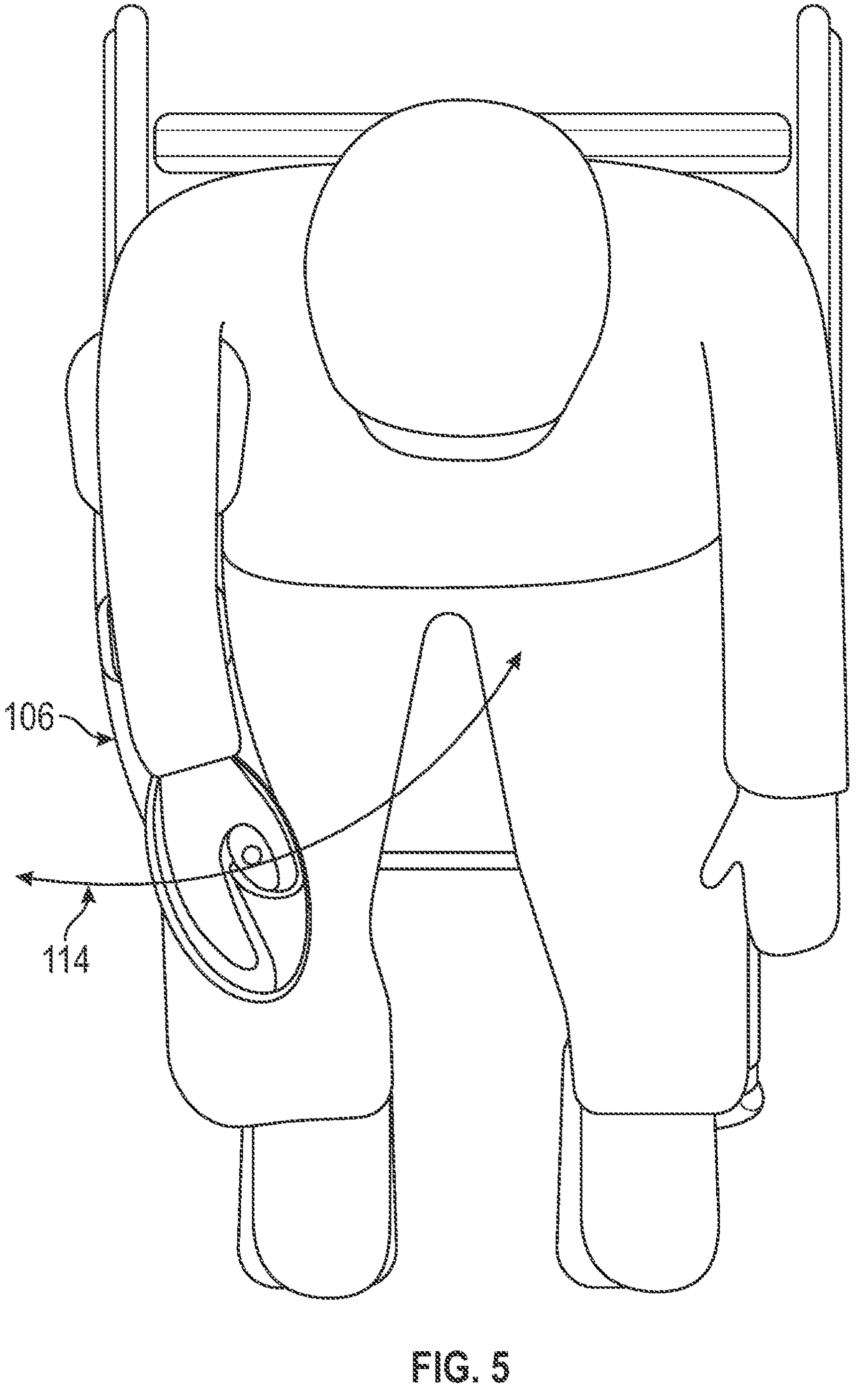
FIG. 5 is a top view showing the arm support and an example of a range of motion in use that may be enabled by the locking pivot, in accordance with various embodiments.

FIG. 5 is a top view showing the arm support 106 and an example of a range of motion 114 in use that may be enabled by the locking pivot 100. The range of motion 114 enabled by the locking pivot 100 may allow the user to readily rotate or reposition the arm support 106 at a suitable position for supporting an arm of the user at a location toward the torso of the user or away from a torso of the user, for example. The locking pivot 100 may permit unrestricted 360° movement or may limit the range of motion 114 to be less than 360°, e.g., which may be useful as a safety measure against over-rotating an arm or other body part supported by the support 106 in use.

Figure 6:
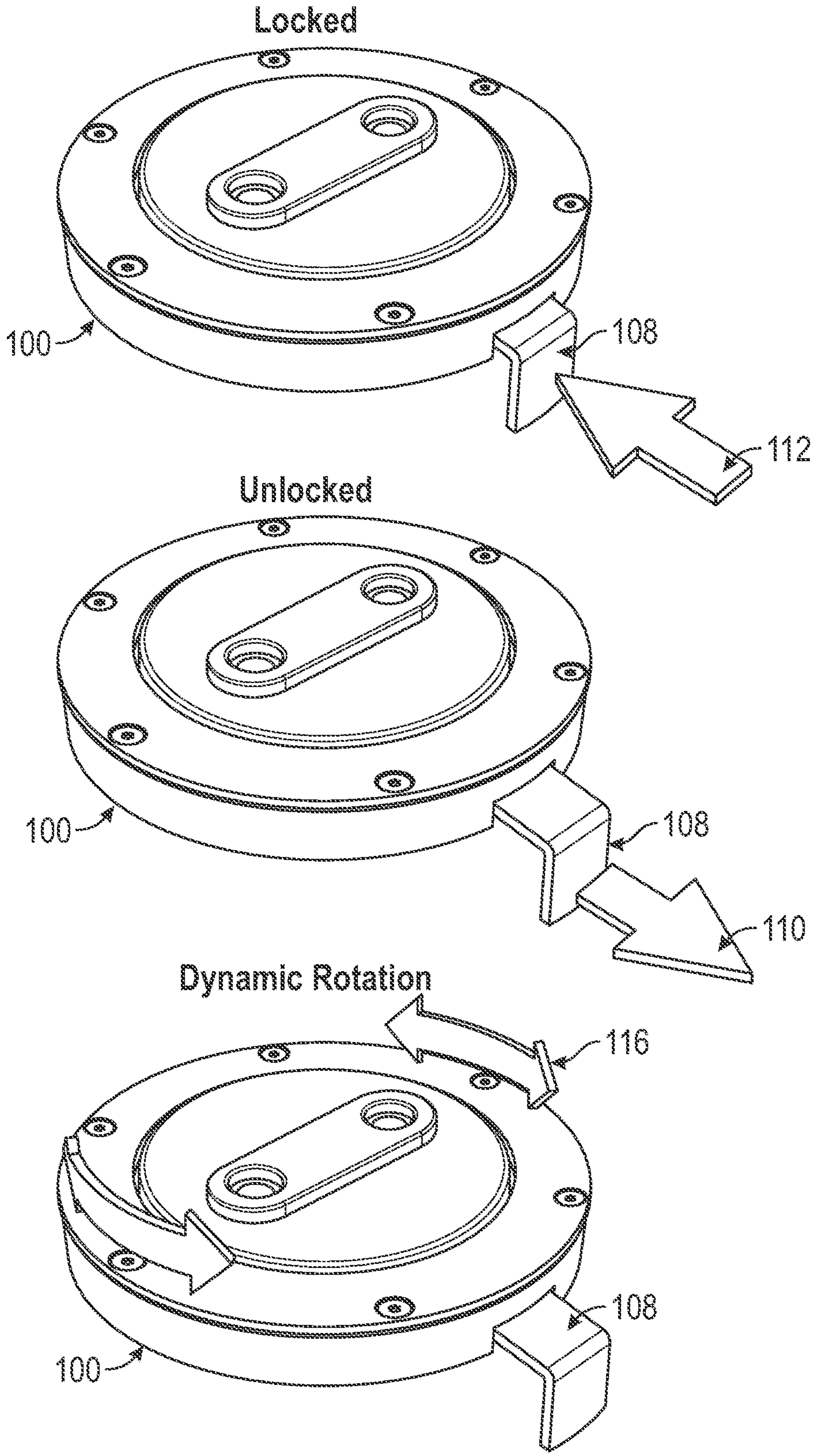
FIG. 6 includes various views that show different states of the locking pivot, in accordance with various embodiments.

FIG. 6 includes various views that show different states of the locking pivot 100. A large state is shown at the top view, and an unlocked state is shown in the middle view, and a dynamic rotation state is shown in the bottom view. In operation, the tab 108 may be pushed inward (as at arrow 112) to reconfigure the locking pivot 100 into the locked state, or pulled outward as (at arrow 110) into the unlocked state, which may allow dynamic rotation of the locking pivot 100 (as at arrow 116).

Figure 7:
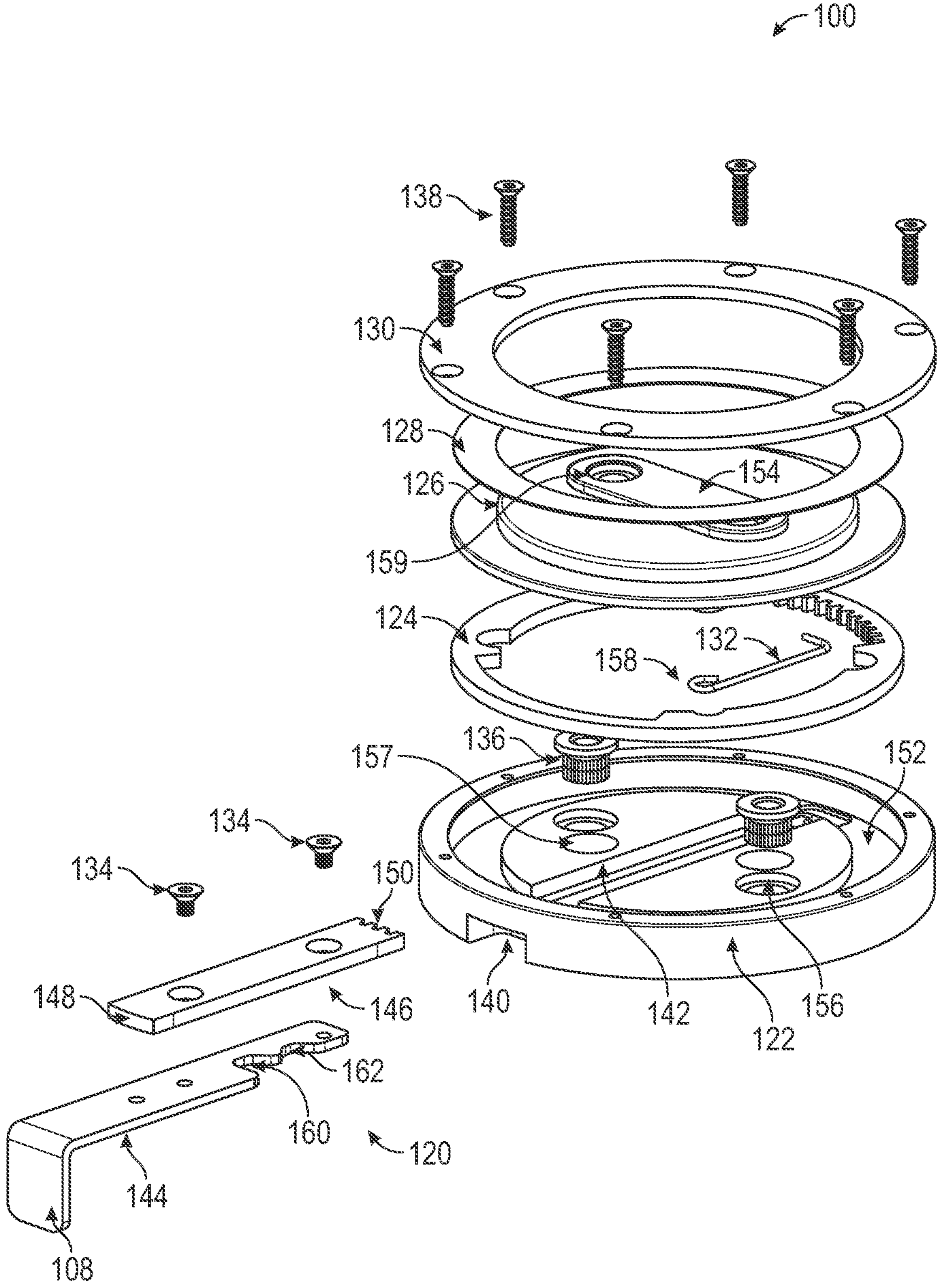
FIG. 7 shows an exploded view of the locking pivot, in accordance with various embodiments.

FIG. 7 shows an exploded view of the locking pivot 100. The locking pivot 100 is shown with a particular combination of features, although any suitable sub-combination or other combination of these and/or other components may be utilized. In the depiction, the particular combination of features includes a shuttle 120, a base 122, a stop ring 124 (which may alternatively be called a locking ring or gear ring), a pivot cap 126, a bearing ring 128, a cap ring 130, and a detent spring 132. Also included in the depiction are suitable fasteners for connecting components together. For example, a first set of fasteners 134, a second set of fasteners 136, and a third set of fasteners 138 are shown in the depiction although any other suitable form of fastener or fastening technique may be used.

The base 122 and various other accompanying components can be generally disc-shaped. The base 122 can include an aperture 140. The aperture 140 can provide a passage through which at least a portion of the shuttle 120 can travel in use. The aperture 140 may align with a track 142 arranged within the base 122 for receiving at least a portion of the shuttle 120 for sliding movement, for example.

The shuttle 120 is shown with two main portions, which may correspond to a slider 144 and a pawl 146. The slider 144 and the pawl 146 are shown as two separate pieces that are fastened together by the first set of fasteners 134 but may correspond to a single monolithic structure in some embodiments.

For assembly, the slider 144 may be inserted through the aperture 140 and into the track 142 of the base 122. With the slider 144 in the track 142, the pawl 146 may be placed atop the slider 144 and secured to the slider 144 with the first set of fasteners 134. Securing the pawl 146 atop the slider 144 may help prevent inadvertent exit of the shuttle 120 through the aperture 140 of the base 122. For example, a rear or trailing portion of the pawl 146 may include a limit face 148 that may be suitably positioned to contact and/or interfere against a portion of the base 122 and/or the stop ring 124 when the tab 108 is moved outwardly from the base 122 and thus prevent rearward or outward movement of the shuttle 120 beyond a predetermined point determined by the limit face 148. At an opposite end, a front or leading portion of the pawl 146 may include at least one tooth 150.

The stop ring 124 can be suitably sized and include appropriate features for interacting with other features of the locking pivot 100. For example, the stop ring 124 may be sized to ride in a perimeter groove 152 of the base 122 or along another suitable upwardly-facing surface of the base 122.

The pivot cap 126 can be sized and arranged to sit atop and/or be coupled with the stop ring 124. Although the pivot cap 126 and the stop ring 124 are shown as different parts that may be coupled together in operation so as to move as a single monolithic unit, the pivot cap 126 and the stop ring 124 may be formed as a single monolithic part in some embodiments.

The pivot cap 126 can include an upper attachment interface 154, and the base 122 can include a lower attachment interface 156. The upper attachment interface 154 is depicted as an obround boss, and the lower attachment interface 156 is depicted as through-holes in which the second set of fasteners 136 may be received to provide threaded interfaces for bolt attachment. For example, an obround boss may be configured to engage with a mating slot in an attached structure, which may ensure alignment and provide an effective interface of transmitting torque when the locking pivot 100 is locked from rotation. In some examples, features may be included in the base 122 to facilitate attaching the pivot cap 126 with superstructure without dismantling of the locking pivot 100. For example, the base 122 may include through-passages 157 that may be aligned with an underside of the obround boss or other structure of the upper attachment interface 154 of the pivot cap 126. In operation, the pivot cap 126 may be rotated relative to the base 122 to bring the through-passages 157 in the base 122 into alignment with the underside of the upper attachment interface 154 of the pivot cap 126. In such aligned position, screws or other fasteners may be inserted through the through-passages 157 of the base 122 and into and/or through openings 159 in the obround boss or other structure of the upper attachment interface 154 of the pivot cap 126 (e.g., where other views of the through-passages 157 and the openings 159 are also visible in FIG. 15). For example, this may allow installation into a superstructure by a combination of the obround boss (e.g., fitting into a mating slot in the superstructure) and the screws or other fasteners extending through the openings 159 and into the superstructure. Such screws or other fasteners may be routed (e.g., upward in the orientation of FIG. 7) to pass entirely through and out of the through-passages 157, e.g., so as to avoid interference with rotation of the pivot cap 126 relative to the base 122 upon completing installation. However, the upper attachment interface 154 and the lower attachment interface 156 are not so limited to the described structures and can correspond to any suitable structure for respectively attaching upper and lower structures to the locking pivot 100.

The pivot cap 126 may move relative to the base 122 (e.g., with the pivot cap 126 and the stop ring 124 moving together relative to the base 122). In use, relative movement (e.g., relative rotational movement) between the pivot cap 126 and the base 122 may allow relative motion e.g., relative rotational motion) between an upper structure attached by the upper attachment interface 154 to the pivot cap 126 and a lower structure attached by the lower attachment interface 156 to the base 122.

The cap ring 130 may provide a suitable top to contain other components within the locking pivot 100. For example, the cap ring 130 may be secured by the third set of fasteners 138 to the base 122. Securing the cap ring 130 to the base 122 can form an enclosure in which other portions or parts of the locking pivot 100 are contained and/or retained.

The bearing ring 128 may provide a bearing surface between the pivot cap 126 and the cap ring 130. In some embodiments, the bearing ring 128 corresponds to a shim that may occupy space between the pivot cap 126 and the cap ring 130, e.g., to account for any manufacturing tolerances. The bearing ring 128 may include Delrin or other suitable material for bearing surfaces.

The detent spring 132 can be arranged to bias the shuttle 120 among different positions or states (such as a locked state or an unlocked state). In various embodiments, the detent spring 132 is positioned within the track 142 in use. The detent spring 132 may include a detent 158 that may engage a portion of the slider 144 or the shuttle 120. For example, the detent 158 may alternatively engage a locked notch 160 and an unlocked notch 162 that may be present on the slider 144 or other portion of the shuttle 120. For example, in the arrangement shown in FIG. 7, pushing in on the tab 108 may move the slider 144 inwards and move the 158 detent from the unlocked notch 162 and into locked notch 160, which may urge the pawl 146 into engagement with the stop ring 124 (e.g., with the teeth 176 discussed further below with respect to FIG. 12 and/or with camming motion as described with respect to FIG. 14).

Figure 8:
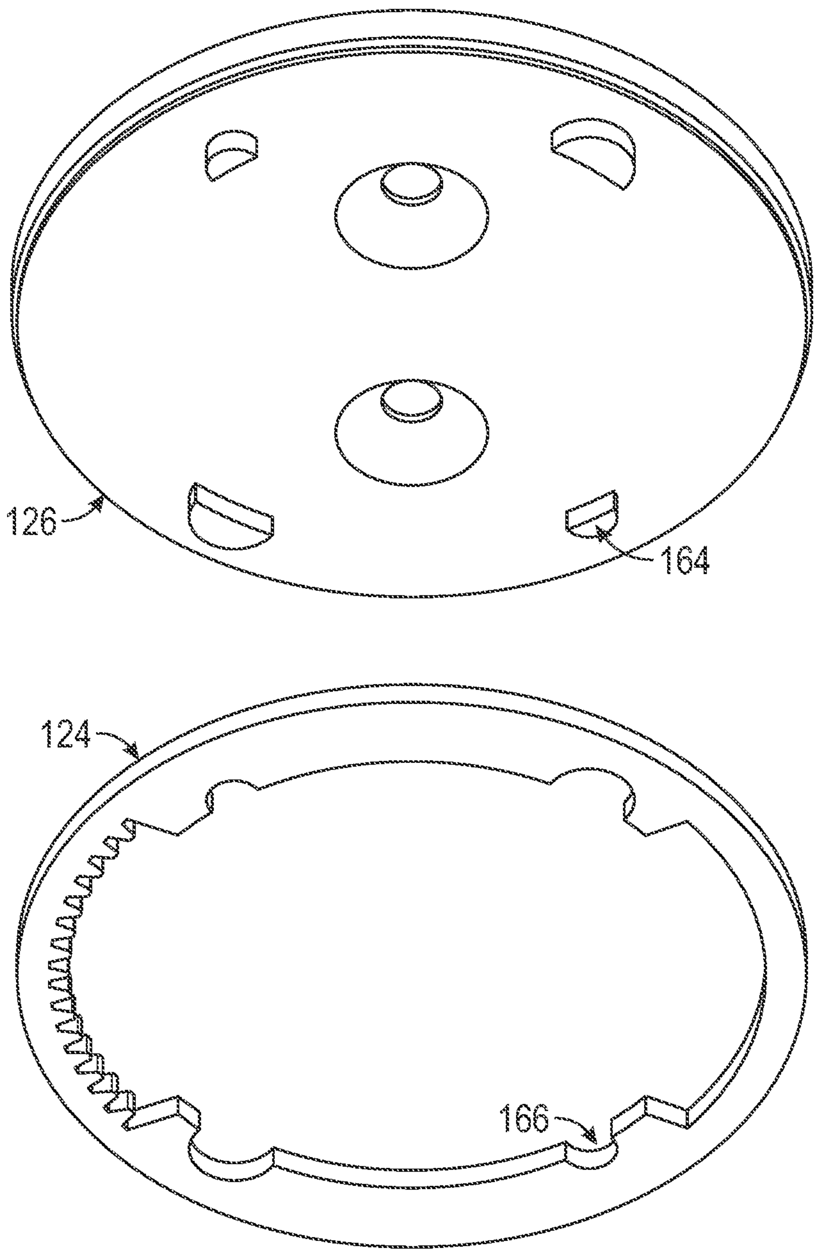
FIG. 8 shows the stop ring and the pivot cap positioned in alignment for coupling, in accordance with various embodiments.

FIG. 8 shows the stop ring 124 and the pivot cap 126 positioned in alignment for coupling. The stop ring 124 and the pivot cap 126 can include suitable features for coupling with one another. In FIG. 8, the pivot cap 126 includes shaped pins 164 having outer contours that match profiles of receptacles 166 in the stop ring 124. Although the pins 164 and receptacles 166 are shaped as semicircles in FIG. 7, any other form of matching shapes may be utilized. At least some of the pins 164 may be different sizes from one another so that the pivot cap 126 and the stop ring 124 have a single orientation in which they align for coupling.

Figure 9:
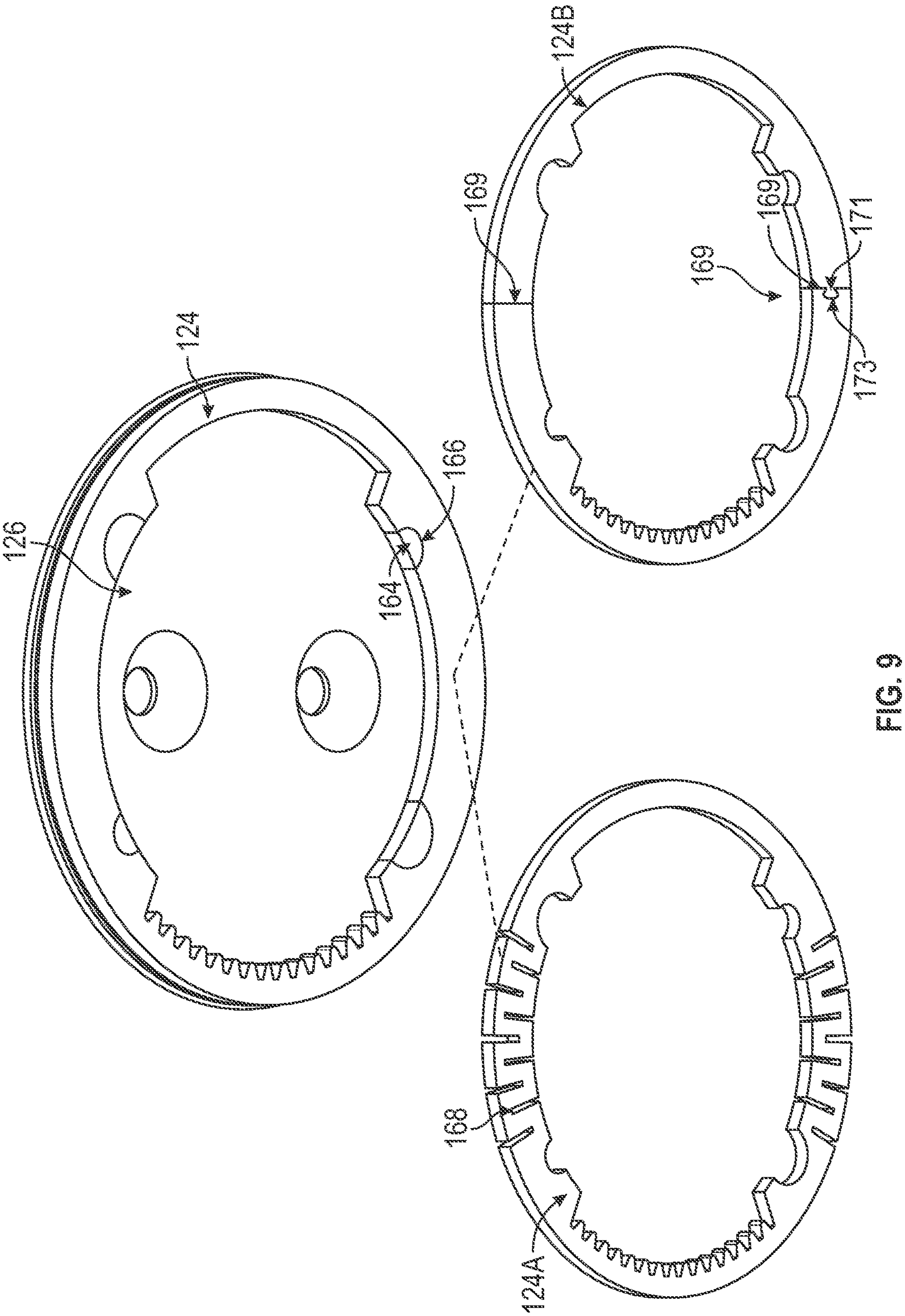
FIG. 9 shows the stop ring and the pivot cap coupled together, in accordance with various embodiments.

FIG. 9 shows the stop ring 124 in the pivot cap 126 coupled together. For coupling, the pins 164 of the pivot cap 126 may be received in receptacles 166 of the stop ring 124. Receiving the pins 164 in the receptacles 166 may provide a suitable interface for transfer of torque between the components. Moreover, although pins 164 are shown on the pivot cap 126 and receptacles 166 are shown on the stop ring 124, relative orientations may be reversed to provide pins 164 on the stop ring 124 and receptacles 166 on the pivot cap 126 and/or any other suitable form of coupling structure may be utilized.

FIG. 9 also shows examples of other features that may be included in the stop ring 124. For ease of viewing, these are shown implemented relative to substitute stop rings 124A and 124B, although any combination of discussed features may be used in combination or individually.

Alternating cut-ins 168 may be included. The cut-ins 168 may alternate between including cut-ins that extend radially inward from an outer diameter and cut-ins that extend radially outward from an inner diameter of the stop ring 124A. The cut-ins 168 may be laser cut, water jet cut, stamped, machined, or formed by any other suitable technique. In use, including the cut-ins may improve flexibility of the stop ring 124A, e.g., permitting stretching and contracting similar to a spring shape and/or providing suitable flexibility to facilitate installation relative to the pivot cap 126.

Joining interfaces 169 may be included. The joining interfaces 169 may correspond to mating opposite edges at which subparts are joined together to form the stop ring 124B. For example, the stop ring 124B is shown formed of two semi-circular components, although more than two may be utilized. Any suitable geometry may be utilized along the joining interfaces 169. As one example shown in a lower portion of the view in FIG. 9, the joining interfaces 169 may include a lobe 171 on one subpart and a receiving receptacle 173 with a matching shape on the opposing mating subpart (e.g., such that the subparts fit together similar to puzzle pieces or other interlocking relationship). As one example shown in an upper portion of the view in FIG. 9, the joining interfaces 169 may include flat edges. For example, the flat edges may be maintained in contact or sufficient proximity by engagement of the lobe 171 with the receiving receptacle 173 if present and/or by engagement of the shaped pins 164 with the receptacle 166. Providing the stop ring 124B as multiple subparts joined at joining interfaces 169 may facilitate manufacturing benefits, such as permitting similar semi-circular subparts to be cut in a nested or nearby configuration from a single sheet and thereby reduce scrap material compared to scenarios in which a single unitary part is formed by cutting out a single central portion that becomes scrap.

Figure 10:
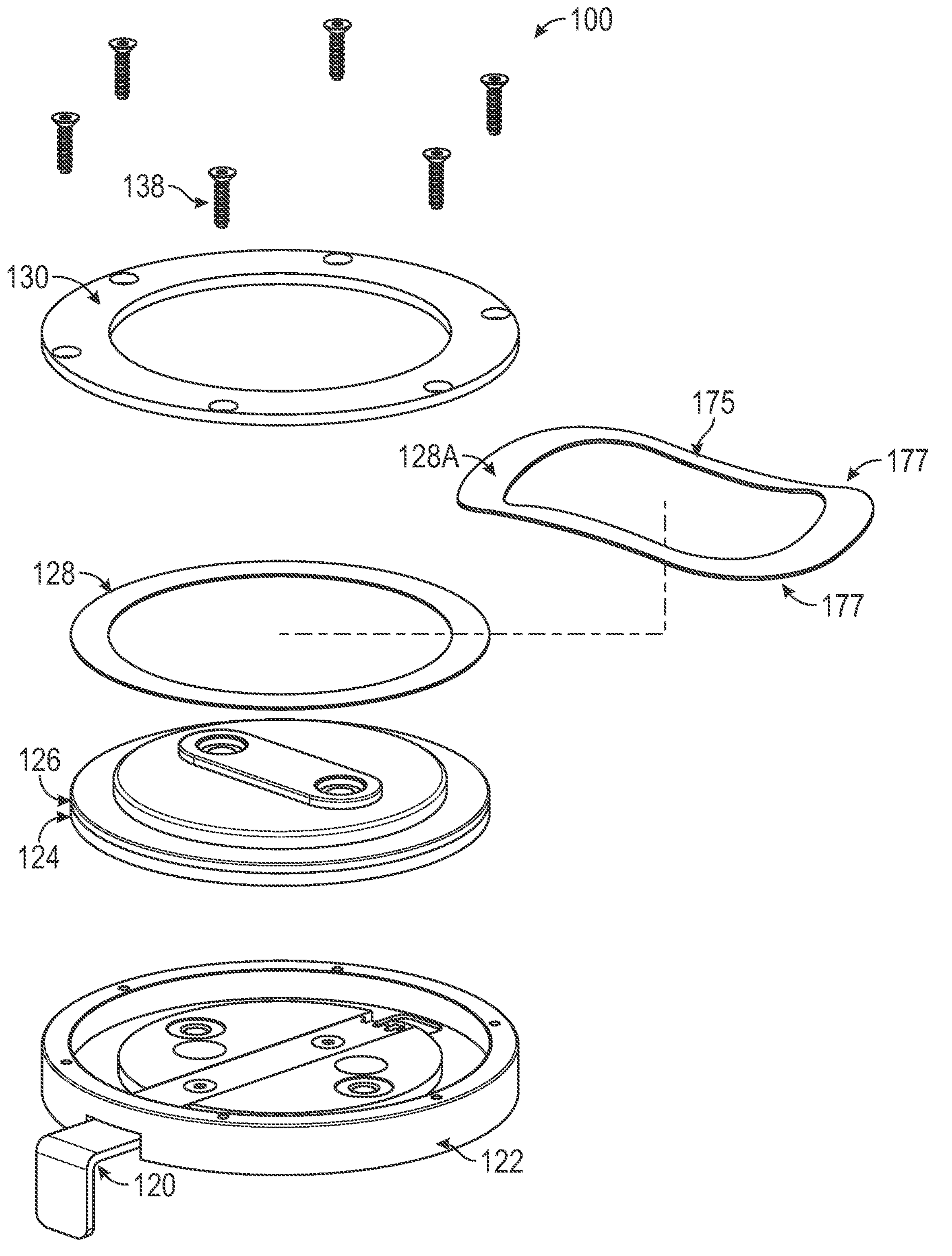
FIG. 10 shows another exploded view of the locking pivot with various components combined into subassemblies, in accordance with various embodiments.

FIG. 10 shows another exploded view of the locking pivot 100 with various components combined into subassemblies. For example, in FIG. 10, the shuttle 120 is shown installed within the base 122, and the pivot cap 126 is shown coupled together with the stop ring 124.

Any suitable materials may be used within the locking pivot 100. Suitable materials may include metal, plastics, or other suitably robust material. Some components may share a same type of material as other components in some embodiments. For example, in some embodiments, the base 122 and the bearing ring 128 may both include Delrin or other suitable bearing material to facilitate sliding movement relative adjacent parts. In some embodiments, portions of the shuttle 120 and the stop ring 124 are formed of machined and/or stamped metal, e.g., to provide suitable strength and/or resistance during gearing interaction or other forms of engagement with the adjacent parts.

FIG. 10 also shows examples of other features that may be included in the bearing ring 128. For ease of viewing, these are shown implemented relative to a substitute bearing ring 128A (shown in a perspective side view), although any combination of discussed features may be used in combination or individually.

Undulations 175 may be included. For example, the undulations 175 may be imparted by crimping or otherwise deforming some segments of the bearing ring 128. The undulations 175 may include peaks and valleys, e.g., which may change between upward and downward orientations at inflection points 177. Inflection points 177 (e.g., which may be at the extremes of the peaks and valleys) may correspond to locations at which the bearing ring 128 has been crimped or deformed. The undulations 175 can cause the bearing ring 128 to provide the function of a spring washer. In use, the undulations 175 may cause the bearing ring 128 to expand or contract to occupy a gap between the cap ring 130 and the pivot cap 126. The ability to occupy the gap may permit the bearing ring 128 to accommodate variations in manufacturing precision and/or may permit looser tolerances to be utilized in comparison to implementations with a fully flat bearing ring 128.

Figure 11:
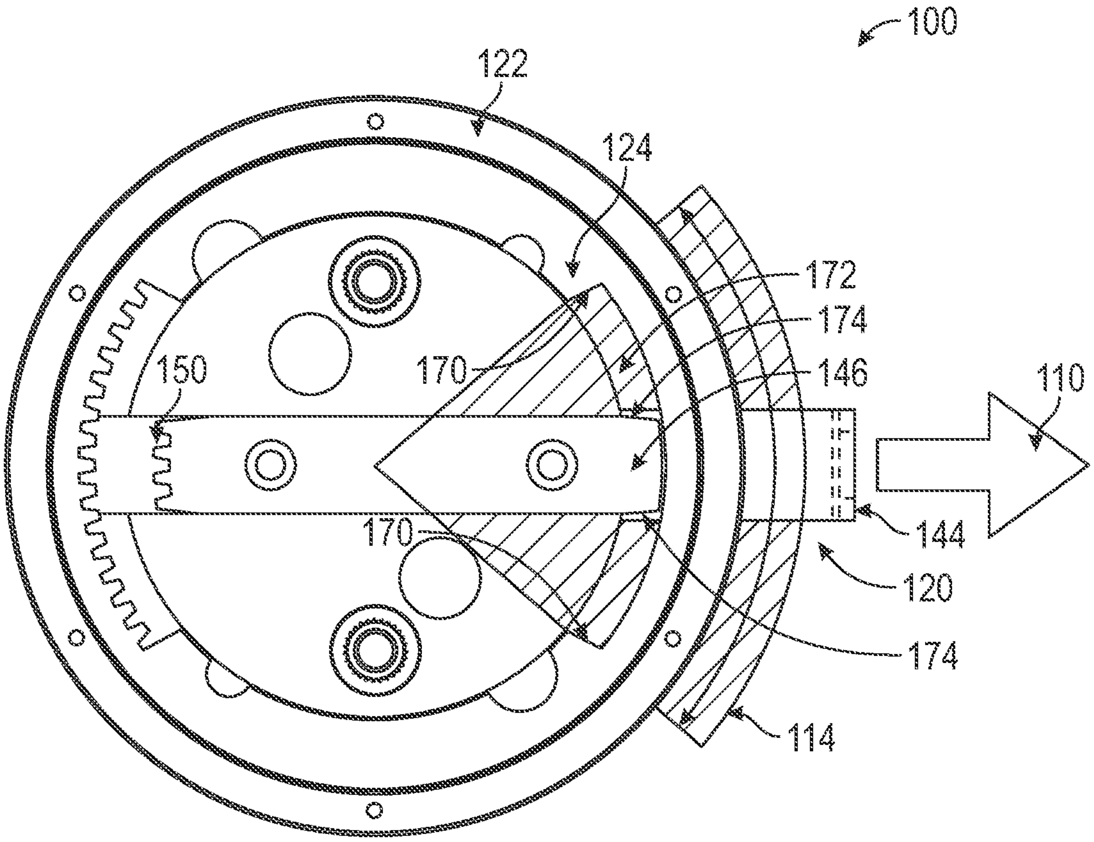
FIG. 11 shows a top cutaway view of the locking pivot in an unlocked state, in accordance with various embodiments.

FIG. 11 shows a top cutaway view of the locking pivot 100 in an unlocked state. For example, the view in FIG. 11 may correspond to the locking pivot 100 with the pivot cap 126 and other upper components removed. In the unlocked state, the at least one tooth 150 of the shuttle 120 may be positioned out of engagement from the stop ring 124. The locking pivot 100 may reach the unlocked state in response to movement of the shuttle 120 from the base 122, e.g., as depicted by arrow 110.

The stop ring 124 may be permitted to rotate in the unlocked state, e.g., between limits determined by the stop ring 124. For example, the stop ring 124 can include stops 170. The stops 170 may correspond to faces formed along a recess 172 on an inner perimeter of the stop ring 124, for example. The recess 172 may correspond to an inset along an inner perimeter of the stop ring 124, for example.

In operation, the stops 170 may come into contact with the shuttle 120 in response to rotation of the stop ring 124. For example, the pawl 146 may include lateral sides 174 that may contact the stops 170 in response to rotation of the stop ring 124. The stops 170 may be arranged to provide endpoints of the range of motion 114 of the relative movement of the base 122 and the stop ring 124. In various examples, the size of the range of motion 114 and/or angle encompassed by the range of motion 114 may be readily adjusted by changing a location of the stops 170 along the circumference of the stop ring 124, such as by further machining the stop ring 124 and/or replacing the stop ring 124 with one having a different size (e.g., length) of recess 172 or location of the stops 170.

The stop ring 124 can be suitably positioned relative to elements of the shuttle 120. For example, the stop ring 124 may be positioned so that the stops 170 and/or the recess 172 align at a same plane or level as the pawl 146. The stop ring 124 can be positioned above a plane or level of the slider 144. For example, positioning the stop ring 124 over the slider 144 may allow the slider 144 to move underneath the stop ring 124 for actuation (e.g., as illustrated by arrow 110). Positioning the stop ring 124 over the slider 144 may further allow the stop ring 124 to be able to rotate above the slider 144 (e.g., within the range of motion 114) when the locking pivot 100 is unlocked.

Figure 12:
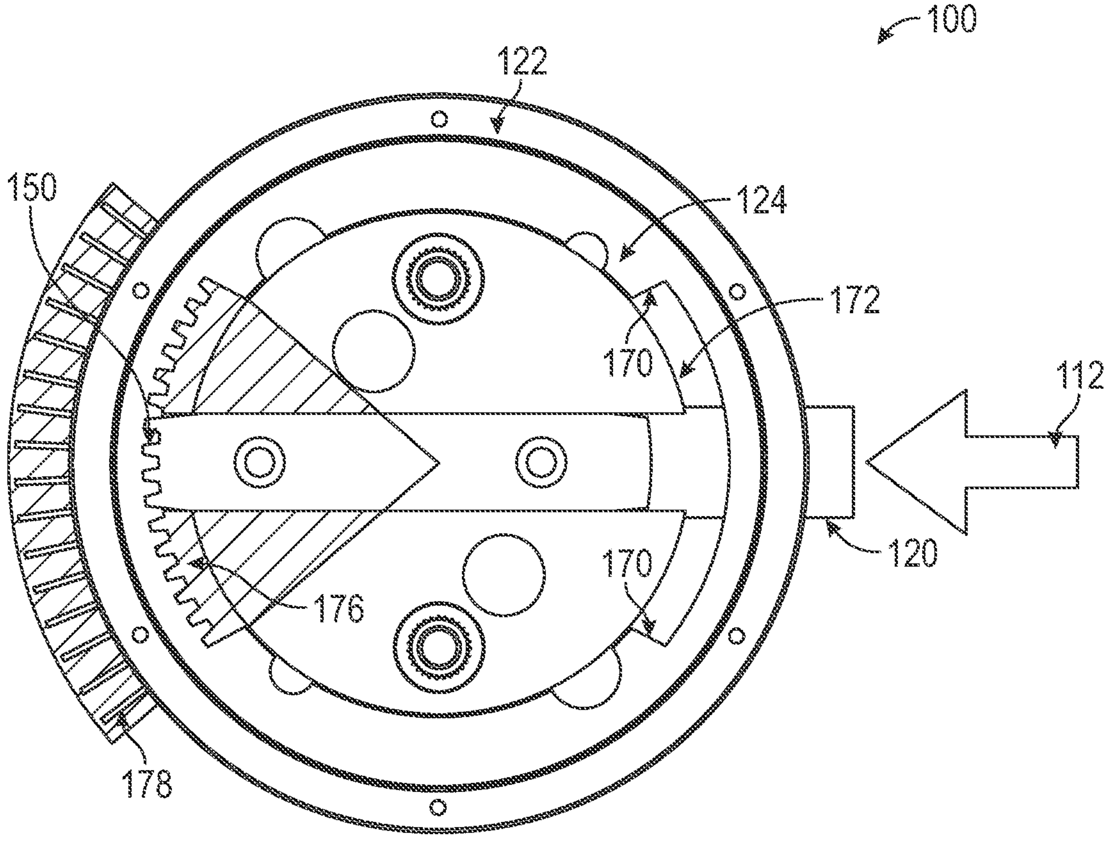
FIG. 12 shows a top cutaway view of the locking pivot in a locked state, in accordance with various embodiments.

FIG. 12 shows a top cutaway view of the locking pivot 100 in a locked state. For example, the view in FIG. 12 may correspond to the locking pivot 100 with the pivot cap 126 and other upper components removed. The locking pivot 100 may reach the locked state in response to movement of the shuttle 120 inwardly into the base 122, e.g., as depicted by arrow 112.

In the locked state, the at least one tooth 150 of the shuttle 120 may be positioned in engagement with the stop ring 124. The stop ring 124 may include suitable structure to facilitate the engagement. For example, the stop ring 124 can include teeth 176. The teeth 176 may be formed along a portion of the inner perimeter of the stop ring 124. In the locked state, the teeth 176 of the stop ring 124 and the at least one tooth 150 of the shuttle 120 may engage one another (e.g., meshing like gears). Engagement of the teeth 176 of the stop ring 124 and the at least one tooth 150 of the shuttle 120 may lock the stop ring 124 in place and prevent or inhibit rotational motion of the stop ring 124.

The at least one tooth 150 of the shuttle 120 may selectively engage different ones of the teeth 176 of the stop ring 124, which may allow the shuttle 120 to selectively lock the stop ring 124 at different positions 178. As an illustrative example, in use, the at least one tooth 150 of the shuttle 120 may initially engage a first group of one or more of the teeth 176 of the stop ring 124 to secure the locking pivot 100 at a first position 178. Continuing this illustrative example, the shuttle 120 may be retracted, the stop ring 124 may be rotated along the base 122, and the at shuttle 120 may be re-extended to move back toward engagement with the stop ring 124. As a result, the at least one tooth 150 of the shuttle 120 can be brought into engagement with a second group of one or more teeth 176 of the stop ring 124 to secure the locking pivot at a second position 178.

The positions 178 may correspond to increments of 5° or other increments. The increments may be determined by the spacing of the teeth 176 of the stop ring 124.

The teeth 176 may be present on the stop ring 124 at a different portion of the inner perimeter of the stop ring 124 than the stops 170 and/or the recess 172. For example, the teeth 176 may be positioned at an opposite extreme from the stops 170 and/or the recess 172. The locking portion of the stop ring 124 (e.g., that includes the teeth 176) and the stopping portion of the stop ring 124 (e.g., that includes the recess 172 and/or the stops 170) may be sized to each cover a same angle (e.g., 60° or other amount), although differing angles are also viable (e.g., such as in a scenario in which it may be of interest to have a free-rotating range that is larger or otherwise different than a range of locking positions or locations).

Figure 13:
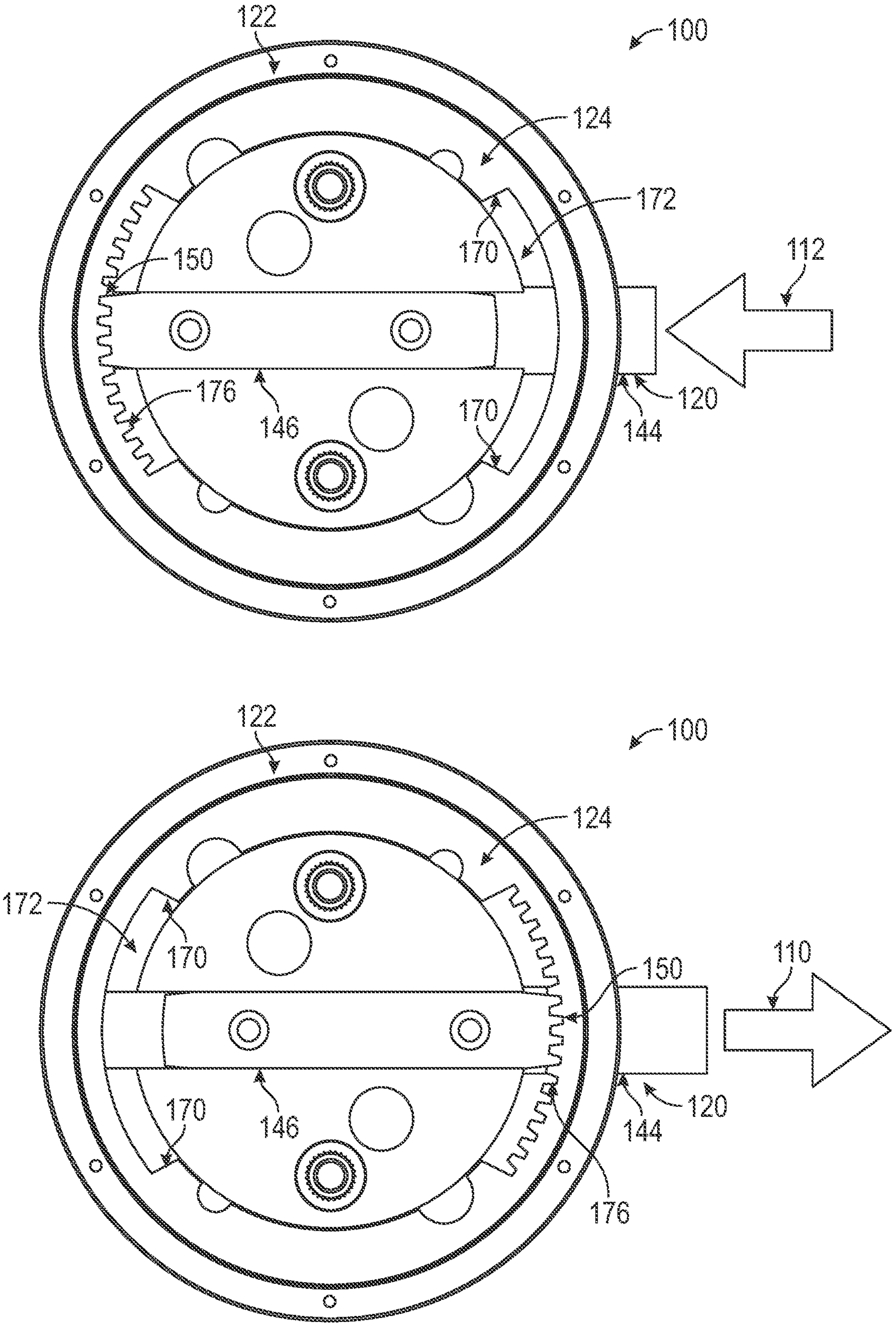
FIG. 13 shows multiple top cutaway views of the locking pivot and illustrates different configurations for operation of the shuttle, in accordance with various embodiments.

FIG. 13 shows multiple top cutaway views of the locking pivot 100 and illustrates different configurations for operation of the shuttle 120. As may be appreciated from FIG. 13, in various embodiments, the locking pivot 100 may be readily reconfigured between a push-to-lock configuration (e.g., as in the top view of FIG. 13) and a pull-to-lock configuration (e.g., in the bottom view of FIG. 13). The slider 144 and the pawl 146 may be releasably coupled together (e.g., such that the pawl 146 is detachable and re-attachable), which may facilitate such reconfiguration.

As an illustrative example, the locking pivot 100 may start in the push-to-lock configuration, e.g., so that the locking pivot 100 will lock in response to movement of the shuttle 120 inward toward the base 122, as illustrated by arrow 112 in the top view in FIG. 13. To reconfigure, the pawl 146 may be removed (e.g., by removing the first set of fasteners 134 shown in FIG. 1). With the pawl 146 removed, the stop ring 124 may be re-oriented to change a position of the teeth 176 along the base, such as by flipping the stop ring 124 or causing the stop ring 124 to be rotated along the base 122 (e.g., clockwise or counterclockwise by 180° or other suitable amount, such as to the position shown in the bottom view in FIG. 13). As a result, the teeth 176 of the stop ring 124 may be positioned on an opposite side (e.g., right side instead of left side) of the base 122. The pawl 146 may also be re-oriented (e.g., turned or flipped around) and re-attached to the slider 144 in an opposite orientation (e.g., with the at least one tooth 150 facing an opposite or different second direction along the slider 144 than a first direction at removal). In the new orientation, the pawl 146 may be suitably positioned to engage the teeth 176 of the stop ring 124, e.g., such that the locking pivot 100 is reconfigured from the push-to-lock configuration of the top view of FIG. 13 to the pull-to-lock configuration of the bottom view of FIG. 13 and in which the locking pivot 100 will lock in response to movement of the shuttle 120 outward from the base 122, as illustrated by arrow 110.

The push-to-lock configuration may also correspond to a pull-to-unlock configuration, and the pull-to-lock configuration may also correspond to a push-to-unlock configuration. Capability to reconfigure between a push-to-lock/pull-to-unlock and a pull-to-lock/push-to-unlock configuration may be useful for accommodating user preference and/or situational suitability. For example, in some scenarios a pull-to-unlock configuration may conveniently allow a user to have a cord etc. connected to the tab 108 so that the cord can be easily pulled like a rip-cord to release the locking pivot 100 into a free spin or rotatable mode from a locked mode. In other scenarios, a user may be interested in reaching a free spin mode free spin or rotatable mode from a locked mode by mashing down a first on the tab 108 or otherwise hitting the tab 108 like an emergency stop or emergency operation button, which may be facilitated by the push-to-unlock configuration.

Figure 14:
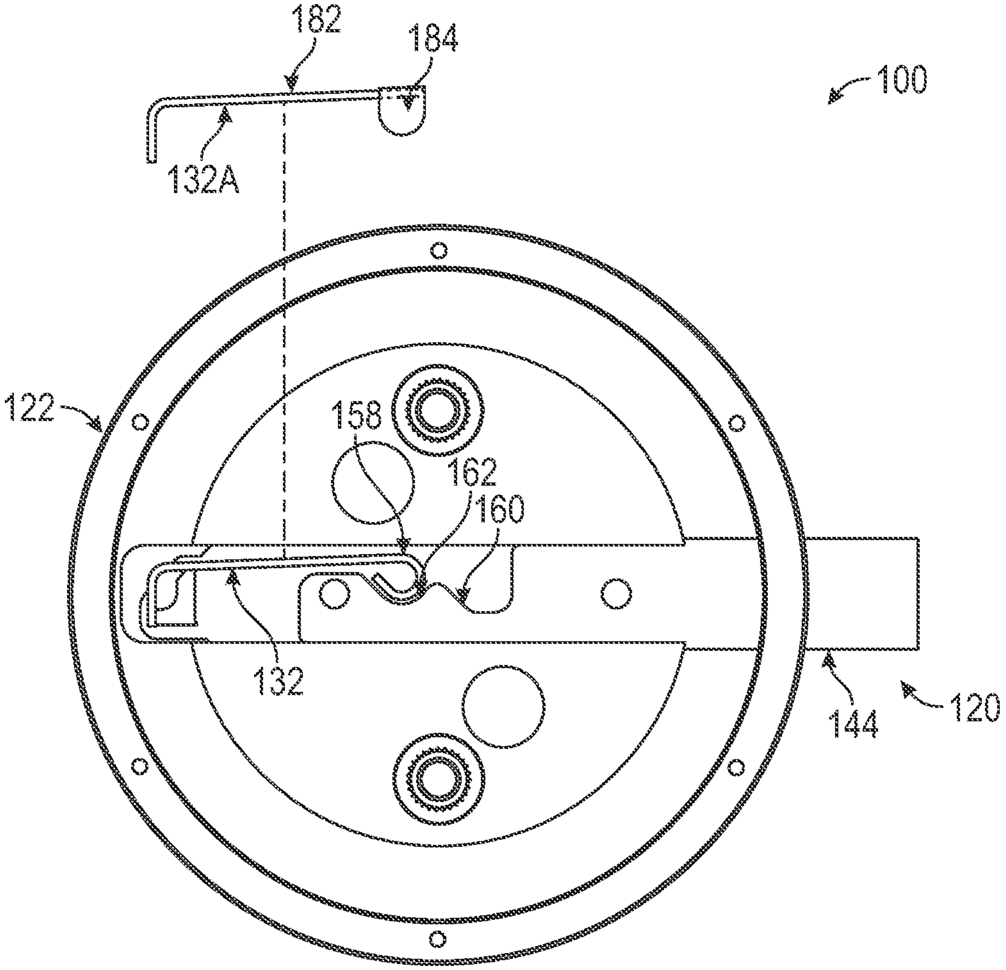
FIG. 14 is a top cutaway view of the locking pivot and shows positioning of the detent spring, in accordance with various embodiments.

FIG. 14 is a top cutaway view of the locking pivot 100 and shows positioning of the detent spring 132. The detent spring 132 may be suitably positioned for maintaining the locking pivot 100 in the locked state (and/or in the unlocked state). For example, the detent spring 132 may maintain the state of the locking pivot 100 absent sufficient intervention such as actively pushing or pulling of the shuttle 120.

The detent spring 132 can correspond to a leaf spring or other structure having suitable resilience and flexibility to deflect and return for exerting a biasing force. The detent spring 132 may correspond to a wire which is doubled over or otherwise bent to form the detent 158 at one end, for example. One end of the detent spring 132 may be anchored in a recess or other feature within the base 122, e.g., to permit an opposite end of the detent spring 132 to impart a biasing force during movement of the detent 158. The detent 158 may travel along camming surfaces in the locked notch 160 and the unlocked notch 162 and cause movement of the slider 144 or other portion of the shuttle 120 until arriving fully in the unlocked or locked state. For example, if the at least one tooth 150 of the shuttle 120 is incompletely received within the teeth 176 of the stop ring 124 (such as if contacting a peak rather than a trough), the force exerted by the detent spring 132 against the camming surface may bias the at least one tooth 150 into more fulsome engagement upon further rotation of the stop ring 124 (such as by driving the at least one tooth 150 into trough of the teeth 176 of the stop ring 124 upon alignment from the rotation of the stop ring 124). The detent 158 may rotate or otherwise flex outwardly to shift between the locked notch 160 and the unlocked notch 162 in response to movement of the shuttle 120.

FIG. 14 also shows examples of other features that may be included in the detent spring 132. For ease of viewing, these are shown implemented relative to substitute detent spring 132A, although any combination of discussed features may be used in combination or individually.

The substitute detent spring 132A may include different sub-elements, such as a spring portion 182 and a detent portion 184 (e.g., which may include the detent 158). The spring portion 182 and the detent portion 184 may be formed of different materials, for example. The spring portion 182 may be formed of metal in some examples. The detent portion 184 may be formed of Delrin or other suitably slippery material to facilitate gliding while travelling along camming surfaces in and/or in between the locked notch 160 and the unlocked notch 162. Using Delrin or other suitable material in the detent portion 184 may reduce wear and/or increase fatigue resistance in comparison to constructions that instead utilize metal or other material along bearing surfaces. The detent portion 184 may be coupled with the spring portion 182 (such as by sliding, snapping, and/or other insertion into a groove or other receiving feature therein) to form the detent spring 132A and/or may be formed by any other suitable technique.

Figure 15:
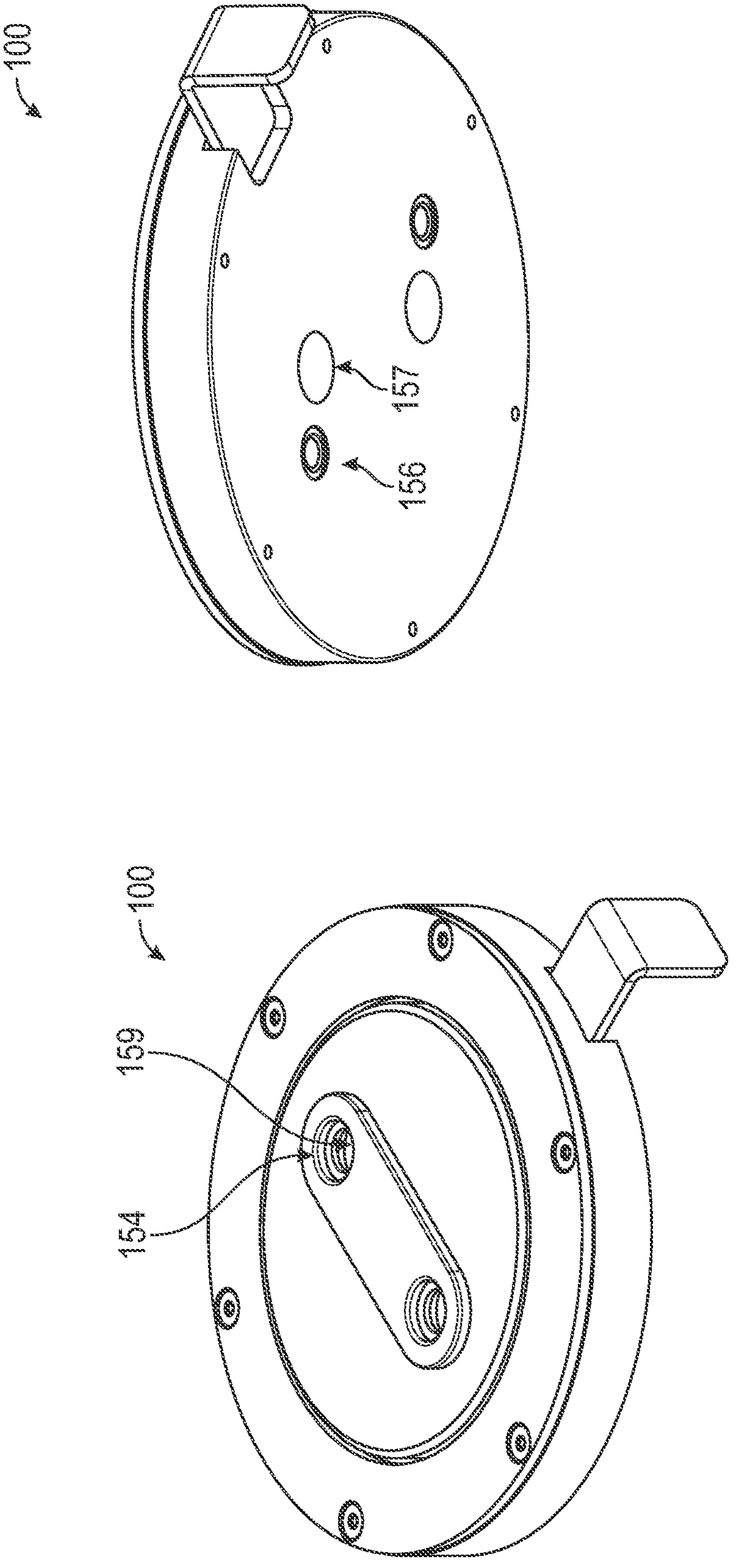
FIG. 15 shows a top perspective view and a bottom perspective view of the locking pivot.

FIG. 15 shows a top perspective view and a bottom perspective view of the locking pivot 100. The upper attachment interface 154 may be accessible from a top side of the locking pivot 100 (e.g., as shown in the top perspective view at left in FIG. 15). The lower attachment interface 156 may be accessible from a bottom side of the locking pivot 100 (e.g., as shown in the bottom perspective view at right in FIG. 15).

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A locking pivot for installation between a wheelchair arm and an arm support or between two other structures, the locking pivot comprising:
- a base;
- a stop ring supported within the base and comprising:
  - stops formed by an inset in an inner perimeter of the stop ring; and
  - teeth formed in a different portion of the inner perimeter from the stops;
- a shuttle received in the base and comprising:
  - at least one tooth selectively engageable with the teeth of the stop ring to selectively lock the stop ring at different positions; and lateral surfaces engageable with the stops to define a predetermined range of motion of the stop ring within the base.

2. The locking pivot of claim 1, further comprising a pivot cap coupled with and atop the stop ring, wherein the pivot cap comprises an upper attachment interface configured for coupling with an upper structure to permit relative motion between the upper structure and the base.

3. The locking pivot of claim 2, wherein the locking pivot is included in an assembly comprising an arm support for a wheelchair, wherein the arm support comprises the upper structure.

4. The locking pivot of claim 2, wherein the pivot cap is coupled with the stop ring at least by a pin received in a receptacle.

5. The locking pivot of claim 2, further comprising a cap ring secured to the base to form an enclosure in which the stop ring and the pivot cap are contained.

6. The locking pivot of claim 5, further comprising a bearing ring arranged to account for manufacturing tolerances by occupying a space between the pivot cap and the cap ring and arranged to provide a bearing surface between the pivot cap and the cap ring.

7. The locking pivot of claim 6, wherein the bearing ring includes undulations.

8. The locking pivot of claim 1, wherein the shuttle comprises a pawl, wherein the pawl comprises the at least one tooth.

9. The locking pivot of claim 8, wherein the shuttle further comprises a slider releasably coupled with the pawl such that the pawl is detachable and re-attachable in an opposite orientation to reconfigure between a push-to-lock configuration and a pull-to-lock configuration.

10. The locking pivot of claim 1, wherein the base includes an aperture through which at least a portion of the shuttle travels to change between a locked state and an unlocked state of the locking pivot.

11. The locking pivot of claim 1, further comprising a detent movable between a locked notch and an unlocked notch of the shuttle.

12. The locking pivot of claim 11, further comprising a detent spring arranged to bias the detent toward remaining in the locked notch in a locked state and in the unlocked notch in an unlocked state.

13. A wheelchair assembly, comprising:

a wheelchair that includes an arm;

an arm support mounted in a position above the arm; and a locking pivot installed between the arm and the arm support to control relative motion between the arm of the wheelchair and the arm support, the locking pivot comprising:

a base;

a stop ring supported within the base and comprising:

stops formed by an inset in an inner perimeter of the stop ring; and teeth formed in a different portion of the inner perimeter from the stops;

a shuttle received in the base and comprising:

at least one tooth selectively engageable with the teeth of the stop ring to selectively lock the stop ring at different positions; and lateral surfaces engageable with the stops to define a predetermined range of motion of the stop ring within the base.

14. The wheelchair assembly of claim 13, wherein the shuttle comprises a manipulandum moveable to change between a locked state and an unlocked state of the locking pivot.

15. A method of reconfiguring a locking pivot between a push-to-lock configuration and a pull-to-lock configuration, the method comprising:

disassembling the locking pivot, including removing a pawl having a tooth from a slider and from an orientation in which the tooth faces a first direction toward teeth of a locking ring;

re-orienting the locking ring to change a position of the teeth of the locking ring relative to a base of the locking pivot; and reassembling the locking pivot, including attaching the pawl to the slider and in an orientation in which the tooth faces a second direction toward the teeth of the locking ring, the second direction being different from the first direction.

* * * * *